(12) United States Patent
Yu

(10) Patent No.: US 10,788,688 B2
(45) Date of Patent: Sep. 29, 2020

(54) QUANTUM CONFINED STARK EFFECT ELECTROABSORPTION MODULATOR ON A SOI PLATFORM

(71) Applicant: ROCKLEY PHOTONICS LIMITED, London (GB)

(72) Inventor: Guomin Yu, Glendora, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 16/315,569

(22) PCT Filed: Jul. 7, 2017

(86) PCT No.: PCT/GB2017/051998
§ 371 (c)(1),
(2) Date: Jan. 4, 2019

(87) PCT Pub. No.: WO2018/007824
PCT Pub. Date: Jan. 11, 2018

(65) Prior Publication Data
US 2019/0324299 A1 Oct. 24, 2019

Related U.S. Application Data

(60) Provisional application No. 62/359,595, filed on Jul. 7, 2016.

(51) Int. Cl.
*G02F 1/017* (2006.01)
*G02F 1/015* (2006.01)
(Continued)

(52) U.S. Cl.
CPC ........ *G02F 1/01708* (2013.01); *G02B 6/1228* (2013.01); *G02B 6/14* (2013.01);
(Continued)

(58) Field of Classification Search
None
See application file for complete search history.

(56) References Cited

U.S. PATENT DOCUMENTS

| | | | |
|---|---|---|---|
| 2012/0207424 A1* | 8/2012 | Zheng | G02B 6/1228 385/2 |
| 2016/0327759 A1* | 11/2016 | Keyvaninia | H01S 5/0218 |
| 2019/0235286 A1 | 8/2019 | Yu et al. | |

FOREIGN PATENT DOCUMENTS

JP 2004-163753 A 6/2004

OTHER PUBLICATIONS

International Search Report and Written Opinion of the International Searching Authority, dated May 26, 2017, Corresponding to PCT/IT2017/000004, 13 pages.
(Continued)

*Primary Examiner* — Michelle R Connelly
(74) *Attorney, Agent, or Firm* — Lewis Roca Rothgerber Christie LLP

(57) ABSTRACT

An electroabsorption modulator. The modulator comprising an SOI waveguide; an active region, the active region comprising a multiple quantum well (MQW) region; and a coupler for coupling the SOI waveguide to the active region. The coupler comprising: a transit waveguide coupling region; a buffer waveguide coupling region; and a taper region; wherein, the transit waveguide coupling region couples light between the SOI waveguide and the buffer waveguide coupling region; and the buffer waveguide coupling region couples light between the transit waveguide region and the active region via the taper region.

23 Claims, 21 Drawing Sheets

(51) Int. Cl.
*G02B 6/12* (2006.01)
*G02B 6/14* (2006.01)
*G02B 6/122* (2006.01)
*B82Y 20/00* (2011.01)

(52) U.S. Cl.
CPC ...... *G02F 1/01716* (2013.01); *G02F 1/01725* (2013.01); *B82Y 20/00* (2013.01); *G02F 2001/0157* (2013.01)

(56) References Cited

OTHER PUBLICATIONS

International Search Report and Written Opinion of the International Searching Authority, dated Sep. 11, 2017, Corresponding to PCT/GB2017/051998, 15 pages.
Lever, L. et al., "Adiabatic mode coupling between SiGe photonic devices and SOI waveguides", Optics Express, Dec. 31, 2012, pp. 29500-29506, vol. 20, No. 28, OSA.
Moerman, Ingrid et al., "A Review on Fabrication Technologies for the Monolithic Integration of Tapers with III-V Semiconductor Devices", IEEE Journal of Selected Topics in Quantum Electronics, Dec. 1997, pp. 1308-1320, vol. 3, No. 6, IEEE.
Roelkens, Gunther et al., "III-V-on-Silicon Photonic Devices for Optical Communication and Sensing", Photonics, Sep. 18, 2015, pp. 969-1004, MDPI AG, Basel, Switzerland.
Rouifed, Mohamed-Saïd et al., "Advances Toward Ge/SiGe Quantum-Well Waveguide Modulators at 1.3μm", IEEE Journal of Selected Topics in Quantum Electronics, Jul./Aug. 2014, 7 pages, vol. 20, No. 4, IEEE.
U.K. Intellectual Property Office Examination Report, dated Sep. 19, 2018, for Patent Application No. GB1706331.4, 3 pages.
U.K. Intellectual Property Office Examination Report, dated Nov. 12, 2018, for Patent Application No. GB1706331.4, 3 pages.
U.K. Intellectual Property Office Search Report, dated Jul. 13, 2017, for Patent Application No. GB1706331.4, 3 pages.
Rouifed, Mohamed-Saïd et al., "Quantum-confined Stark effect at 1.3 μm in Ge/$Si_{0.35}Ge_{0.65}$ quantum-well structure", Optics Letters, Oct. 1, 2012, pp. 3960-3962, vol. 37, No. 19, Optical Society of America.
Unpublished U.S. Appl. No. 16/915,933, filed Jun. 29, 2020.
U.S. Office Action from U.S. Appl. No. 16/315,510, dated Nov. 27, 2019, 19 pages.

* cited by examiner

Device design -2 based on EPI design #1

Device with GS electrodes
3D view, not in scale

Device with GSG electrodes
3D view, not in scale

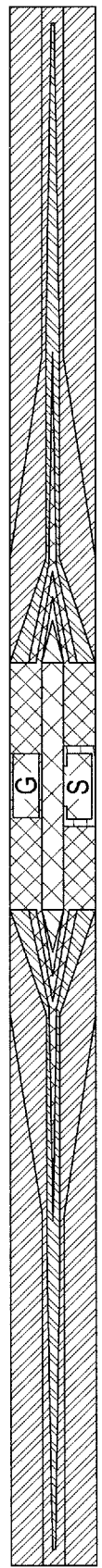
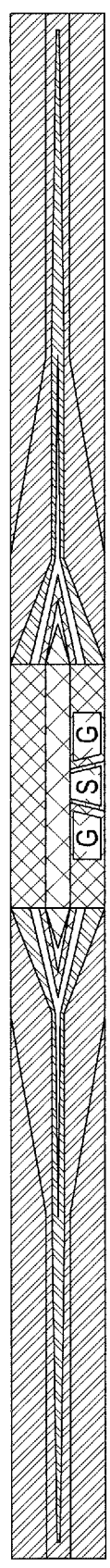
Fig. 7A — Device with GS electrodes, Top view
Fig. 7B — Device with GSG electrodes, Top view EPI design #2

- Difference from EPI design #1
  - Transit buffer layer: 600nm, $Si_{0.9}Ge_{0.1}$
  - cover N layer: $Si_{0.9}Ge_{0.1}$
- Device structure has
  - GS electrodes
  - GSG electrodes

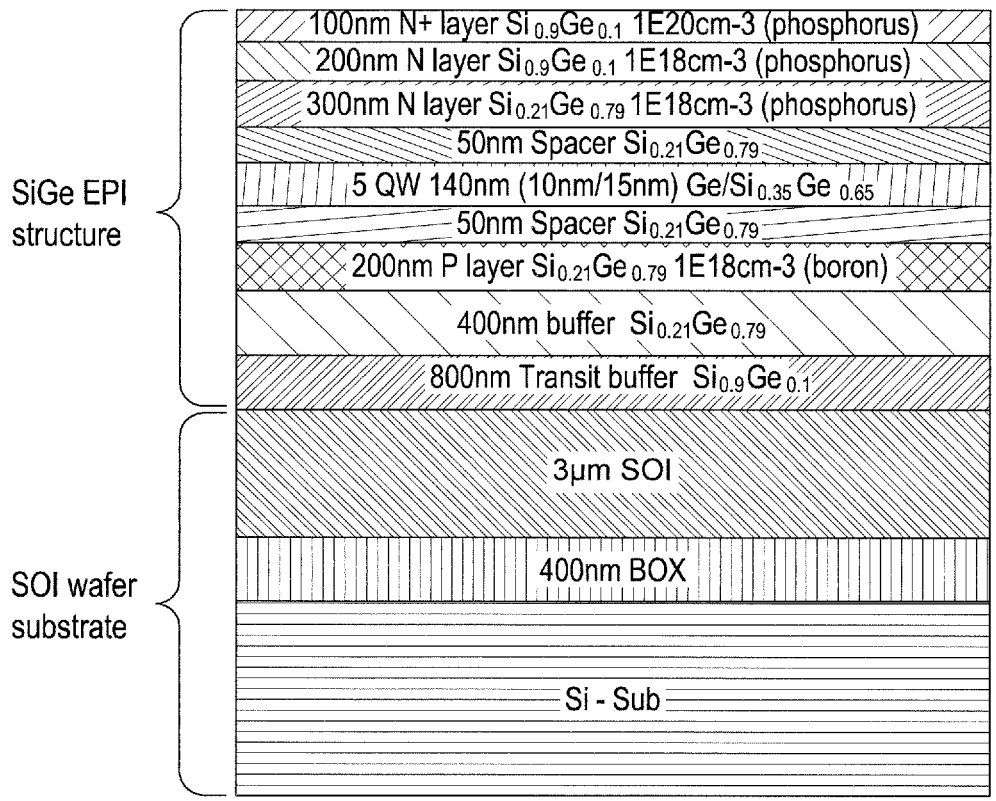

EPI design #3

SiGe EPI structure:
- 100nm N+ layer $Si_{0.9}Ge_{0.1}$ 1E20cm-3 (phosphorus)
- 200nm N layer $Si_{0.9}Ge_{0.1}$ 1E18cm-3 (phosphorus)
- 300nm N layer $Si_{0.21}Ge_{0.79}$ 1E18cm-3 (phosphorus)
- 50nm Spacer $Si_{0.21}Ge_{0.79}$
- 5 QW 140nm (10nm/15nm) $Ge/Si_{0.35}Ge_{0.65}$
- 50nm Spacer $Si_{0.21}Ge_{0.79}$
- 200nm P layer $Si_{0.21}Ge_{0.79}$ 1E18cm-3 (boron)
- 400nm buffer $Si_{0.21}Ge_{0.79}$
- 800nm Transit buffer $Si_{0.9}Ge_{0.1}$ SOI wafer substrate:
- 3μm SOI
- 400nm BOX
- Si - Sub

- Difference from EPI design #1
  — Transit buffer layer: 800nm, $Si_{0.9}Ge_{0.1}$
  — cover N layer : $Si_{0.9}Ge_{0.1}$
- Device structure may have:
  — GS electrodes
  — GSG electrodes

Fig. 13

Input/output 3um SOI waveguide for use with all devices disclosed herein

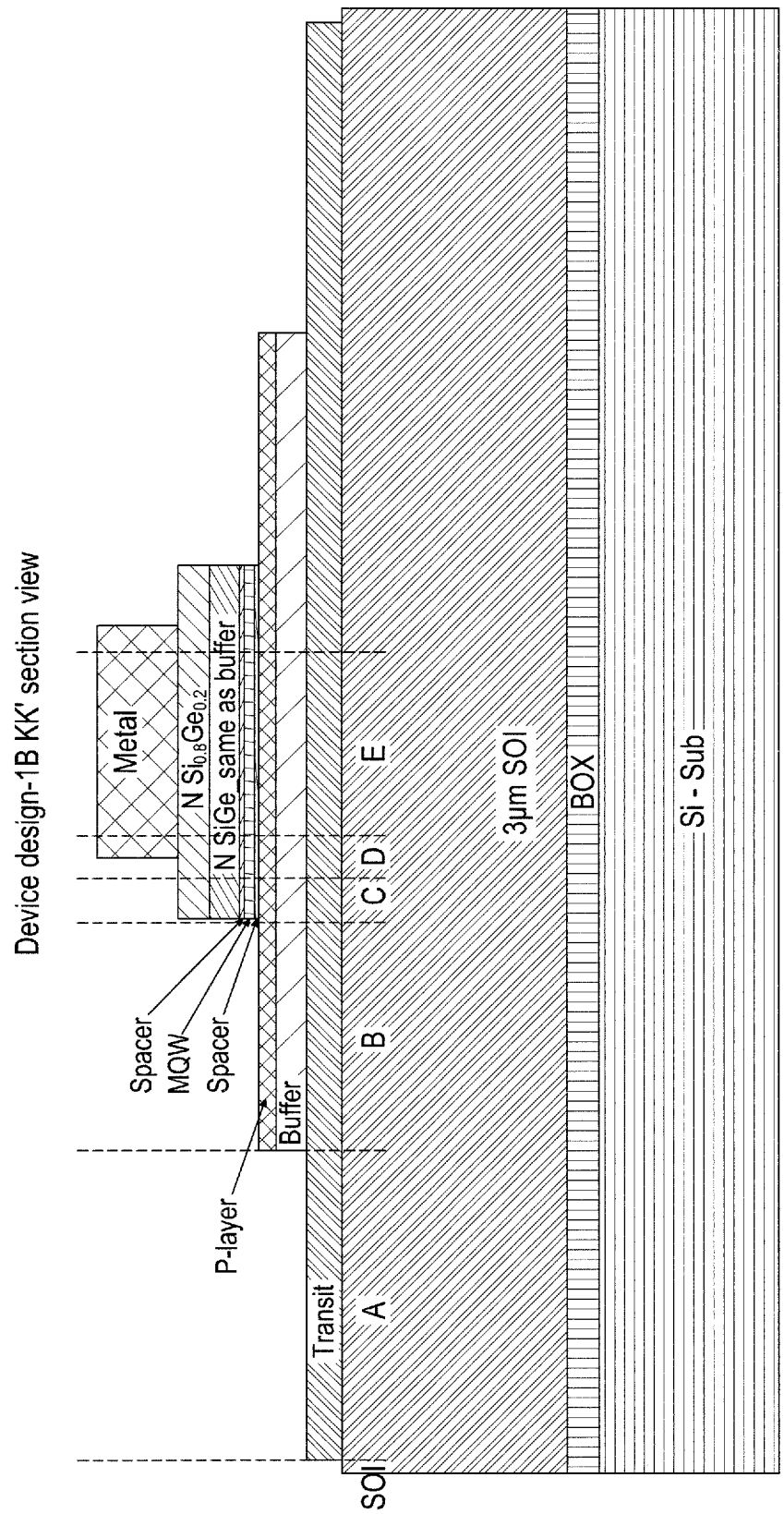

QUANTUM CONFINED STARK EFFECT ELECTROABSORPTION MODULATOR ON A SOI PLATFORM

CROSS-REFERENCE TO RELATED APPLICATION(S)

This application is a U.S. National Phase Patent Application and claims priority to and the benefit of International Application Number PCT/GB2017/051998, filed on Jul. 7, 2017, which claims priority to and the benefit of U.S. Provisional Patent Application No. 62/359,595, filed on Jul. 7, 2016, the entire contents of all of which are incorporated herein by reference.

FIELD

The present invention relates to a modulator and to optical coupling within a modulator on an SOI platform and more particularly to a SiGe quantum confined Stark effect (QCSE) modulator.

BACKGROUND

It is desirable to make high speed SiGe quantum confined Stark effect (QCSE) electroabsorption modulators (EAMs) operating at O-band (1.3 µm wavelength) and CMOS compatible on SOI platform for data centre network applications. Due to the limitation of germanium material properties (bandgap and absorption), problems to make SiGe QCSE EAM operate at O-band on 3 µm SOI platform include 1) the design of SiGe multiple quantum well epitaxy (EPI) stack that can operate at 1.3 µm wavelength; 2) the design of coupling structure that brings the light from 3 µm SOI waveguide into the SiGe multiple quantum well (MQW) waveguide with low loss based on the EPI structure due to large SOI waveguide dimensions and big refractive index contrast between Si and SiGe buffer layer for the SiGe MQW; and 3) the difficulty of realizing 2V driving voltage with CMOS driver because of the carrier screen effect in the MQW region. Embodiments of this invention aim to overcome at least these three problems in making SiGe QCSE EAM on 3 µm SOI platform.

Whilst this application focuses on coupling to 3 µm SOI waveguides, it should be understood that the physical structures described herein could be scaled up or scaled down in size accordingly to other sizes of waveguides.

SUMMARY

According to a first aspect, the invention provides an electroabsorption modulator comprising: an SOI waveguide; an active region, the active region comprising a multiple quantum well (MQW) region; and a coupler for coupling the SOI waveguide to the active region; the coupler comprising: a transit waveguide coupling region; a buffer waveguide coupling region; and a taper region; wherein, the transit waveguide coupling region couples light between the SOI waveguide and the buffer waveguide coupling region; and the buffer waveguide coupling region couples light between the transit waveguide region and the active region via the taper region.

Here are presented a SiGe MQW EPI stack based on 3 µm SOI wafer and an electroabsorption modulator (EAM) based on the SiGe EPI stack. The SiGe MQW EPI stack is designed such that it can: 1) realize operating in O-band (1.3 µm wavelength); 2) fulfil 2V driving voltage for QCSE EAM that is compatible with CMOS drivers by properly choosing the quantum well structure with low optical loss; and 3) support the design of coupling structure to bring light from 3 µm SOI waveguide to the SiGe MQW active region. The SiGe EPI stack comprises (from bottom to top): a transit buffer layer that is for the first evanescent coupling structure to bring light up from the 3 µm SOI waveguide; a buffer layer that serves as the virtual substrate to determine the strain in the well layer and barrier layer in the SiGe MQW, as well as the second evanescent coupling structure to bring light up from the transit buffer layer to the SiGe MQW active region through a taper structure (mode expander); a P-type (e.g. boron) doped layer that acts as the P-side of the PIN junction in the SiGe EAM with a concentration of 1E18 $cm^{-3}$ an intrinsic spacer layer that separates the P-type doped layer and the SiGe quantum wells; a layer of five SiGe quantum wells that comprise five germanium wells and six SiGe barriers—the number of quantum wells should be chosen such that with a 2V driving voltage an extinction ratio of 4 dB or bigger may be achieved at 1.3 µm; an intrinsic spacer layer to separate the quantum wells and the N-type doped layers, a layer of N-type (e.g. phosphorus) doped with a concentration of 1E18 $cm^{-3}$ and the same germanium composition as the P-type doped layer; a layer of N-type doped with a concentration of 1E18 $cm^{-3}$ but a lower germanium composition; a layer of heavily N-type doped with a concentration of 1E20 $cm^{-3}$ and the same germanium composition as the last N-type doped layer. The use of multiple N-type doped layers with different germanium composition and different doping concentrations is to realize both low optical loss and low series resistance to reach high modulation speed.

The SiGe QCSE EAM comprises: an SOI waveguide; an active region, the active region comprising a SiGe multiple quantum well waveguide; and two coupling regions, the coupling region has at least one evanescent coupling and one taper structure to couple light between the SOI waveguide and the SiGe MQW waveguide active region. The SOI waveguide has a typical thickness of 3 µm and a typical width of 2.6 µm based on 3 µm SOI wafers. The evanescent coupling structures in the coupling region comprises a transit buffer layer waveguide and a buffer layer waveguide on top of the transit buffer layer waveguide. The light from the 3 µm SOI waveguide is coupled into the transit buffer layer waveguide first; then the light is coupled into the buffer layer waveguide which may comprise the buffer layer itself only or comprise the buffer layer with the P-type doped layer together; then the light is coupled into the SiGe MQW waveguide via a taper that comprises the transit buffer layer, buffer layer, P-type doped layer, spacer layer, SiGe MQW layers, spacer layer and N-type doped layers. The taper structure is designed such that it expands the optical mode of the buffer waveguide to the optical mode of the SiGe MQW waveguide with low optical loss and minimizes the extra parasitical capacitance to keep the EAM working at high speed. In the active region, the SiGe waveguide is a rib waveguide with the P-type doped layer on top of the slab, on which the metal electrode is deposited. In order to reduce the contact resistance between the metal electrode and the P-type doped layer, an ion implantation is used to make it heavily P-type (e.g. boron) doped followed by a rapid thermal annealing (RTA) process to activate the dopant. The doped concentration is about 1E20 $cm^{-3}$. The electrode on the N-side of the PIN junction of the SiGe EAM contacts the heavily doped N-type layer from the top of the waveguide with the bonding pad on the waveguide slab. In order to reduce the parasitical capacitance, the part of P-type doped layer on the waveguide slab underneath the electrode and the bonding pad for the N-type layer has to be removed. Two kinds of electrode pad arrangements have been used. One arrangement is ground-signal (GS), and the other is ground-signal-ground (GSG). In the GS configuration, a ground electrode is located at an opposite side of the active region from the signal electrode. In a ground-signal-ground (GSG) configuration, a first ground electrode and a second ground electrode are located at the same side of the active region as the signal electrode. The active region may be an active region waveguide. In embodiments of this invention, light is efficiently coupled from 3 µm SOI waveguide to SiGe multiple quantum well (MQW) waveguide, where the light is modulated, then is coupled back to the 3 µm SOI waveguide. This overcomes the inherent problems which arise due to an SOI waveguide having relatively large dimensions and refractive index contrast between Si and the SiGe buffer layer for the SiGe MQW waveguide.

The taper region may comprise a multi-segment mode expander.

The multiple quantum well region may be a Ge/SiGe multiple quantum well region

The transit waveguide coupling region may comprise a first portion of a transit waveguide; and the buffer waveguide coupling region comprises a buffer waveguide located on top of a second portion of the transit waveguide.

Optionally, the transit buffer layer has a refractive index bigger than that of the SOI waveguide but smaller than that of the buffer layer.

Optionally, the SOI waveguide is a 3 µm waveguide; the transit buffer layer has a thickness of no more than 400 nm; and the buffer layer has a thickness of no more than 400 nm.

Optionally, the transit buffer layer has a thickness of no more than 600 nm.

Optionally, the transit buffer layer has a thickness of no more than 800 nm.

Optionally, each of the buffer layer and transit buffer layer are SiGe waveguides.

The active region may comprise: a P-doped region between the buffer layer and the lower surface of a spacer layer underneath a multiple quantum well; and an N-doped region located at the upper surface of a spacer layer on top of the multiple quantum wells.

The modulator may further comprise multiple N-type doped layers with different germanium compositions and doping concentrations.

The waveguide slab of the P-type layer in the active region may be P-doped with ion implantation followed by an RTA process.

The electrodes may be arranged in a ground-signal (GS) configuration, where a ground electrode is located at an opposite side of the active region from the signal electrode.

The electrodes may be arranged in a ground-signal-ground (GSG) configuration, where a first ground electrode and a second ground electrode are located at the same side of the active region as the signal electrode.

The multiple quantum well region may include at least 5 quantum wells.

The modulator may further comprise a metal electrode in contact with a surface of the active region opposite to the coupler, the metal electrode may extend beyond the active region in a direction towards the taper region. The electrode may have a length in the direction towards the taper region which is greater than 2.5 µm. Whilst the active region includes the MQW region, the MQW region may extend beyond a length of the main body of the active region i.e. the MQW region may be coterminous with the spacer layer discussed above. In this way, the MQW region may include at least one tapered portion of MQW material which extends into the taper region; and wherein the metal electrode extends beyond the active region in a direction towards the taper region as far as the tapered portion of MQW material.

The active region may include an N-doped region located above the upper surface of a spacer layer on top of the multiple quantum well region, and the N-doped region may comprise $Si_{0.9}Ge_{0.1}$.

BRIEF DESCRIPTION OF THE DRAWINGS

These and other features and advantages of the present invention will be appreciated and understood with reference to the specification, claims, and appended drawings wherein:

FIG. 7A is the top view of a device design #2 based on the SiGe epitaxial layer structure shown in FIG. 1 with GS electrode structure;

FIG. 7B is the top view of a device design #2 based on the SiGe epitaxial layer structure shown in FIG. 1 with GSG electrode structure;

FIG. 13 is another SiGe epitaxial layer structure including a multiple QW structure, according to an embodiment of the present invention;

FIG. 21 is the section view along the middle line KK' of the device design #1B.

DETAILED DESCRIPTION

The detailed description set forth below in connection with the appended drawings is intended as a description of exemplary embodiments of an electroabsorption modulator provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A first embodiment ("EPI design #1) is shown in FIGS. 1 to 9.

Figure 1:
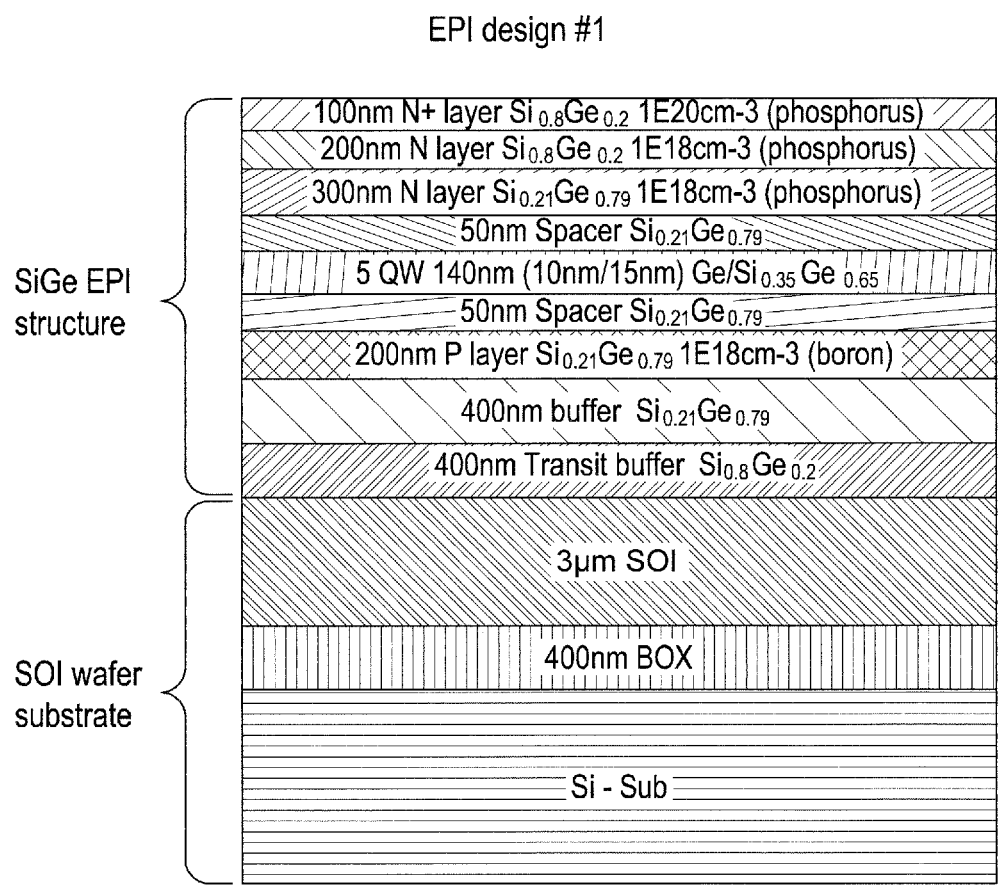
FIG. 1 is a SiGe epitaxial layer structure including a multiple QW structure, according to an embodiment of the present invention.

FIG. 1 shows an example of a SiGe EPI structure in accordance with the present invention in which a thin layer of transit buffer SiGe is inserted between the 3 μm SOI waveguide and the SiGe buffer layer that is for the SiGe MQW.

This transit buffer SiGe layer:
a) has a refractive index larger than that of Si and smaller than that of SiGe buffer layer, therefore, light can be evanescently coupled from the SOI waveguide to the transit buffer SiGe waveguide; and
b) serves as an extra-buffer layer for the SiGe buffer layer of the MQW waveguide to ease the stress due to the crystal lattice mismatch between Si and SiGe MQW, which is critical for the SiGe MQW EPI quality.

The transit buffer SiGe layer shown has a germanium content of 20% ($Si_{0.8}Ge_{0.2}$). Optionally, this transit buffer SiGe layer may have a germanium content ranging from 5% ($Si_{0.95}Ge_{0.05}$) to 50% ($Si_{0.5}Ge_{0.5}$) and a thickness ranging from 400 nm to 1000 nm.

Based on the proposed SiGe EPI structure, the waveguide evanescent coupling structure brings light from the SOI waveguide (which may be a 3 μm SOI waveguide) to a SiGe MQW waveguide in the following steps:
a) From a SOI waveguide (which may be a 3 μm SOI waveguide) to a transit buffer SiGe waveguide (which may be a 400 nm transit buffer SiGe waveguide)
b) From the transit buffer SiGe waveguide (which may be a 400 nm transit buffer SiGe waveguide) to a buffer SiGe waveguide (which may be a 400 nm a buffer SiGe waveguide). The buffer SiGe layer shown has a germanium content of 79% ($Si_{0.21}Ge_{0.79}$). Optionally, this buffer SiGe layer may have a germanium content ranging from 70% ($Si_{0.3}Ge_{0.7}$) to 95% ($Si_{0.05}Ge_{0.95}$), and a thickness ranging from 400 nm to 1000 nm.
c) From the buffer SiGe waveguide (which may be a 400 nm a buffer SiGe waveguide) to a SiGe MQW waveguide via a taper structure. The taper structure expends the optical mode of the buffer waveguide to the optical mode of the SiGe MQW waveguide. Wherein the taper structure and the SiGe MQW waveguide may consist of: the transit buffer SiGe, 400 nm buffer SiGe, 200 nm P-layer, 50 nm spacer, 140 nm quantum well layer (5 QW) which has 15 nm barriers or spacers between respective quantum wells which are 10 nm thick, 50 nm spacer, 300 nm N-layer, 200 nm N-doped cover layer and 100 nm heavily N-doped cover layer as shown in FIG. 1. The P-layer, spacer layers and N-layer may have the same germanium content, (79%, $Si_{0.21}Ge_{0.79}$), as that of buffer layer. Optionally, the P-layer, spacer layers and N-layer may have a germanium content ranging from 70% ($Si_{0.3}Ge_{0.7}$) to 90% ($Si_{0.1}Ge_{0.9}$). The N-doped cover layer and heavily N-doped cover layer may have a germanium content less than that of buffer layer, P-layer, spacer layers and N-layer. The germanium content of the N-doped cover layer and heavily doped N-doped cover layer may be 20% ($Si_{0.8}Ge_{0.2}$). Optionally, the germanium content of the N-doped cover layer and heavily doped N doped cover layer may range from 5% ($Si_{0.95}Ge_{0.05}$) to 50% ($Si_{0.5}Ge_{0.5}$). The germanium content of the barrier layer in the quantum well is 65% ($Si_{0.35}Ge_{0.65}$). Optionally, the germanium content of the barrier layer in the quantum well may range from 60% ($Si_{0.4}Ge_{0.6}$) to 85% ($Si_{0.15}Ge_{0.85}$) with a general rule that the average germanium content in the Ge/Si quantum well is the same or substantially the same as the germanium content of the buffer layer. The number of quantum wells is five in this EPI structure. Optionally, the number of quantum wells may range from 5 to 15.

The QCSE EAM consists of two coupling regions, which have two waveguide evanescent coupling structures and one taper structure, and one active region between the two coupling regions The active region preferably has the same waveguide structure as the SiGe MQW waveguide.

Light from the Si waveguide (which may be a 3 um Si waveguide) travels through the first coupling region to reach the active region.

In the active region, light is absorbed and modulated according to the external bias voltage.

After modulation, the light goes through the second coupling region back to a/the Si waveguide (which may be a 3 μm Si waveguide).

Three examples of devices which incorporate the electroabsorption modulator of the present invention are now described.

Figure 2A:
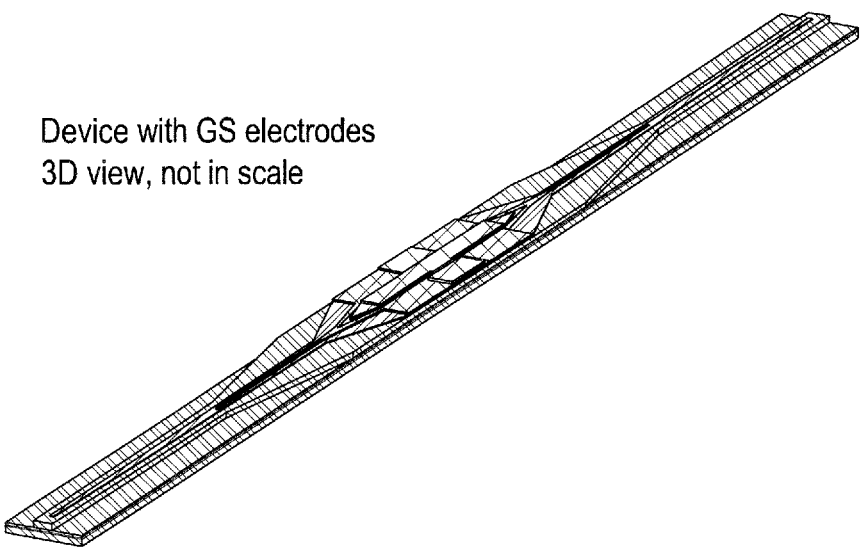
FIG. 2A is a 3D view of a device design #1 based on the SiGe epitaxial layer structure shown in FIG. 1 with GS electrode structure.
Figure 2B:
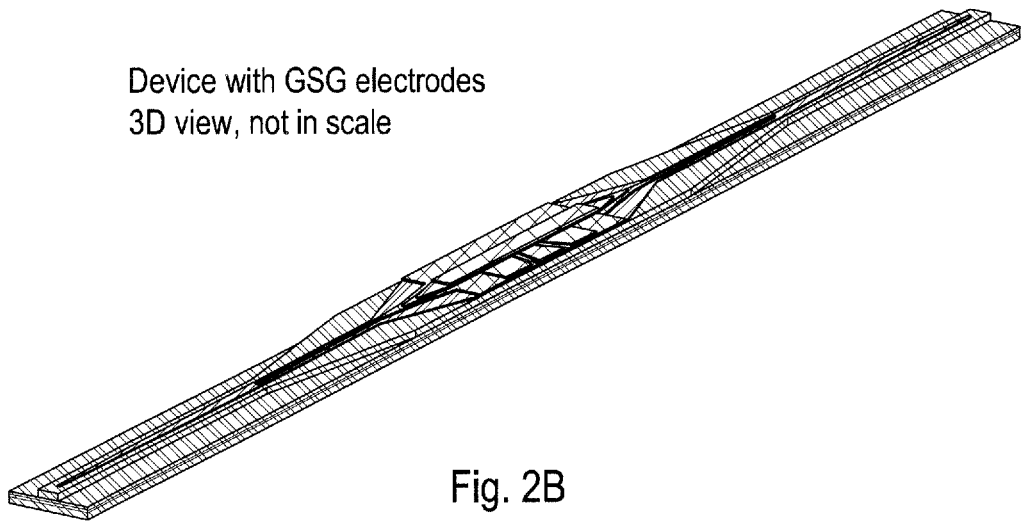
FIG. 2B is a 3D view of a device design #1 based on the SiGe epitaxial layer structure shown in FIG. 1 with GSG electrode structure.
Figure 3A:
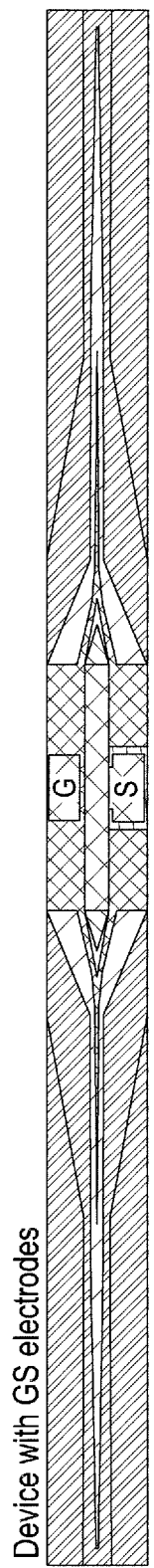
FIG. 3A is the top view of a device design #1 based on the SiGe epitaxial layer structure shown in FIG. 1 with GS electrode structure.
Figure 3B:
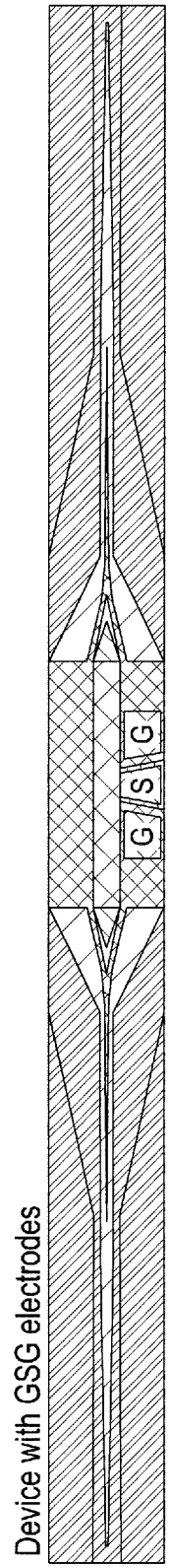
FIG. 3B is top view of a device design #1 based on the SiGe epitaxial layer structure shown in FIG. 1 with GSG electrode structure.
Figure 4:
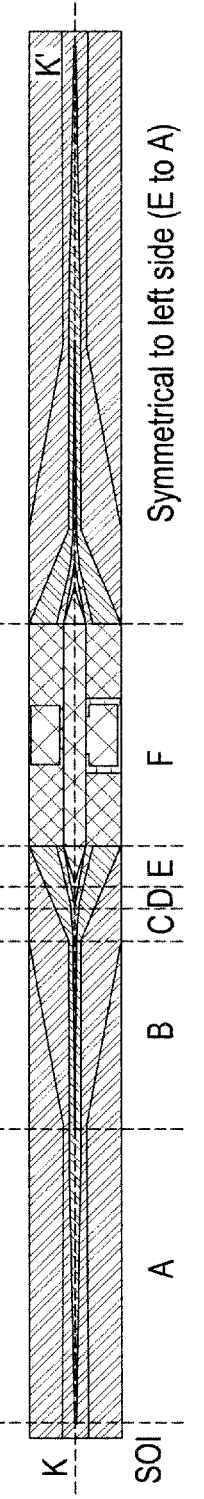
FIG. 4 shows the device design #1 top view with detailed device structure for each section.
Figure 5:
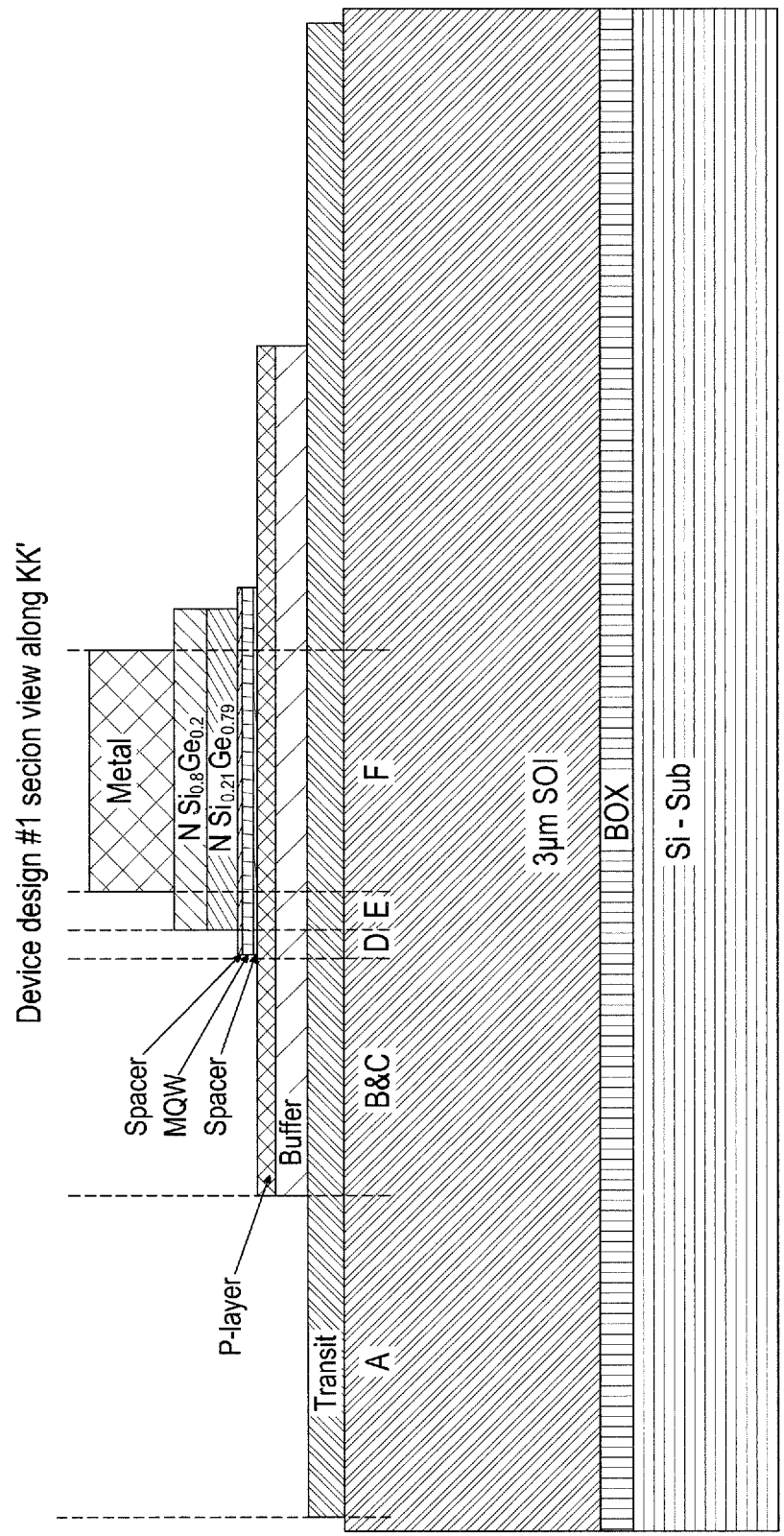
FIG. 5 is the section view along the middle line KK' of the device design #1.

The first example (device design #1 based on EPI design #1) can be seen in the 3D views shown in FIG. 2A and FIG. 2B and also in the top views as shown in FIG. 3A (GS electrodes) and FIG. 3B (GSG electrodes). In this device design #1, the taper structure comprises 5 segments to expand the optical mode of buffer waveguide to the optical mode of SiGe MQW waveguide: three mode expander regions (C, D, and E) as well as the transit waveguide coupling region A and the buffer waveguide coupling region B. An example of measurements for the entire device is shown in FIG. 4 and a section view of the device is shown in FIG. 5. The simulation results for device design #1 at 1.3

µm wavelength for TE mode are below: insertion loss 4.87 dB, extinction ratio 4.16 dB and link penalty 9.97 dB.

Figure 6A:
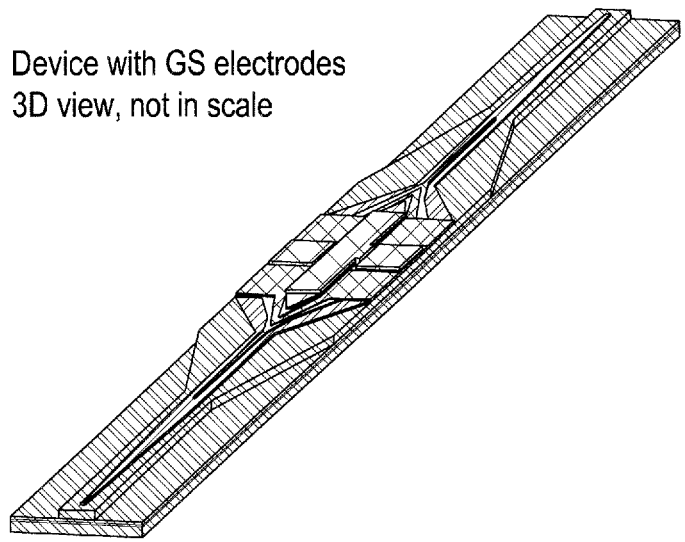
FIG. 6A is a 3D view of a device design #2 based on the SiGe epitaxial layer structure shown in FIG. 1 with GS electrode structure.
Figure 6B:
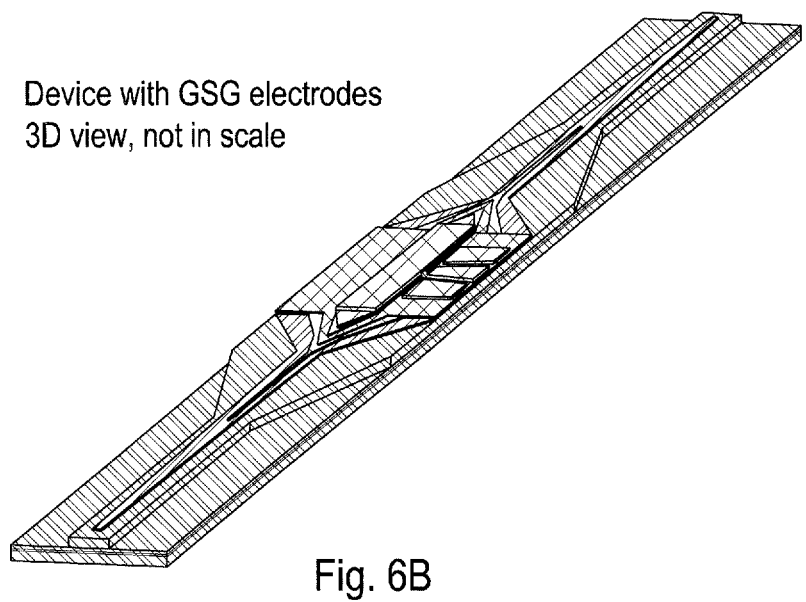
FIG. 6B is a 3D view of a device design #2 based on the SiGe epitaxial layer structure shown in FIG. 1 with GSG electrode structure.
Figure 8:
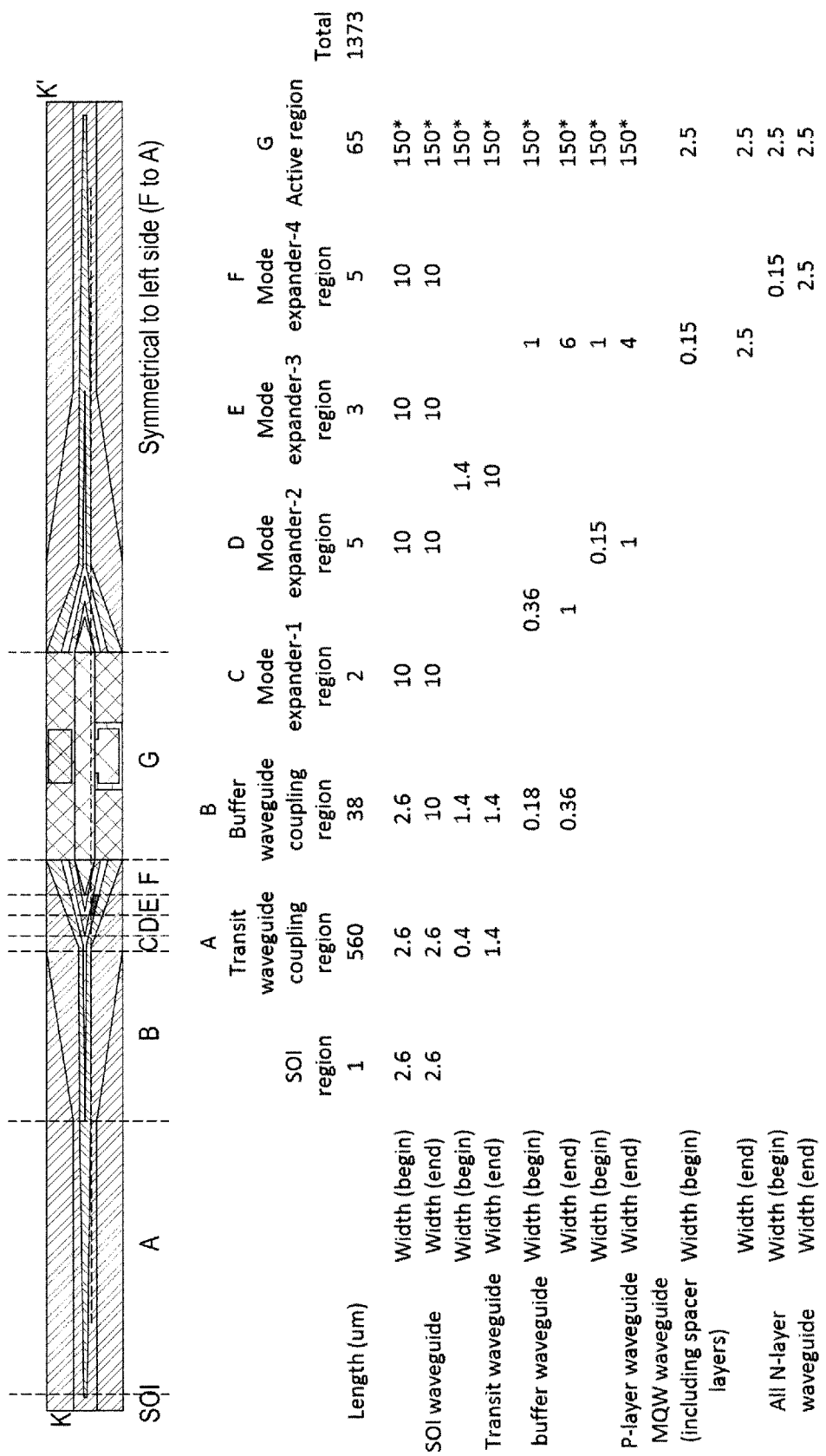
FIG. 8 shows the device design #2 top view with detailed device structure for each section.
Figure 9:
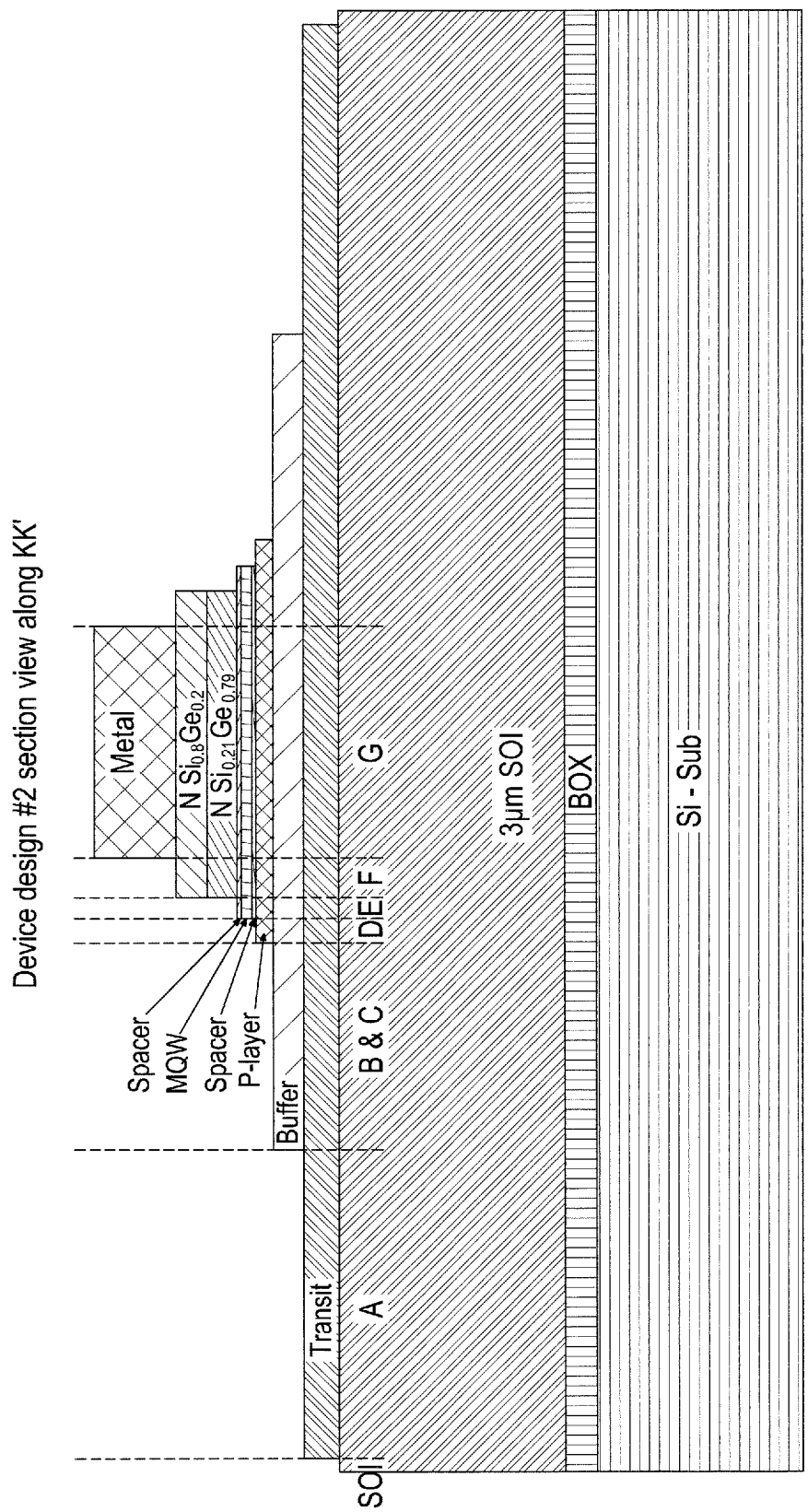
FIG. 9 is the section view along the middle line KK' of the device design #2.

The second example (device design #2 based on EPI design #1) can be seen in the 3D views shown in FIG. 6A and FIG. 6B and also in the top views as shown in FIG. 7A (GS electrodes) and FIG. 7B (GSG electrodes). In this device design #2, the taper structure comprises 6 segments to expand the optical mode of buffer waveguide to the optical mode of SiGe MQW waveguide: four mode expander regions (C, D, E, and F) as well as the transit waveguide coupling region A and the buffer waveguide coupling region B. An example of measurements for the entire device of the second example (device design #2 based on EPI design #1) is shown in FIG. 8 and a section view of the device is shown in FIG. 9. The simulation results for device design #2 at 1.3 µm wavelength for TE mode are below: insertion loss 4.43 dB, extinction ratio 4.16 dB and link penalty 9.53 dB.

Figure 10:
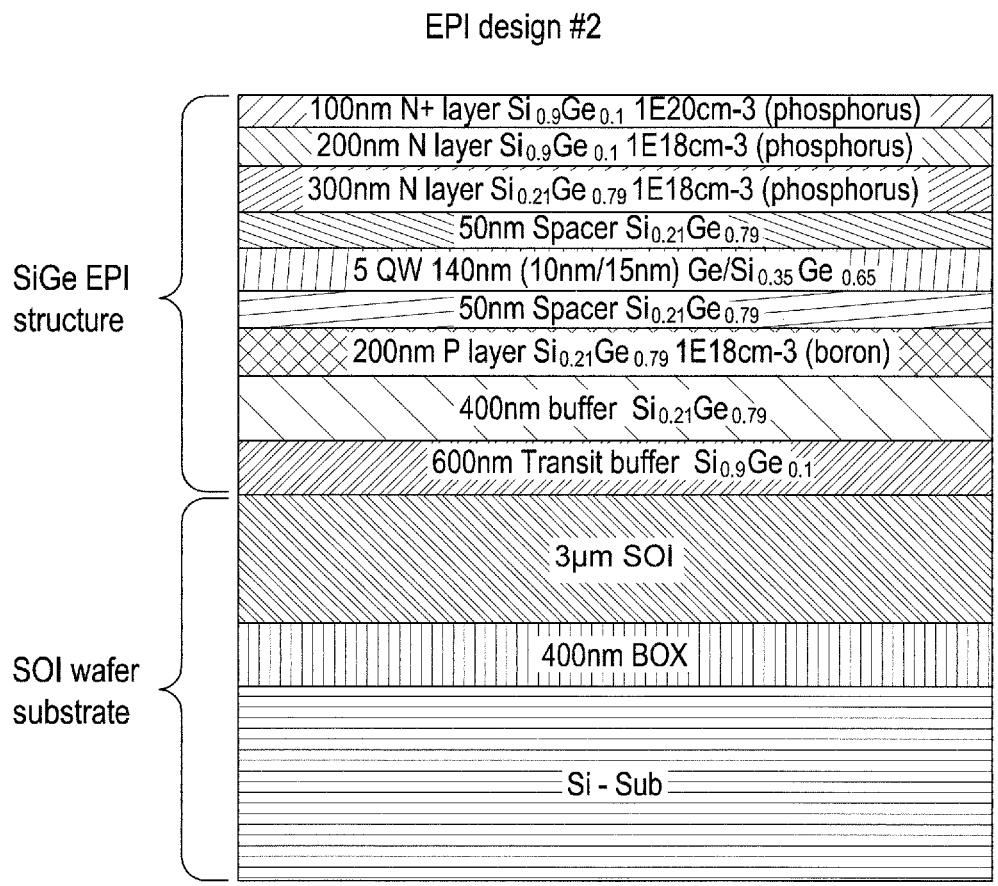
FIG. 10 is another SiGe epitaxial layer structure including a multiple QW structure, according to an embodiment of the present invention.
Figure 11:
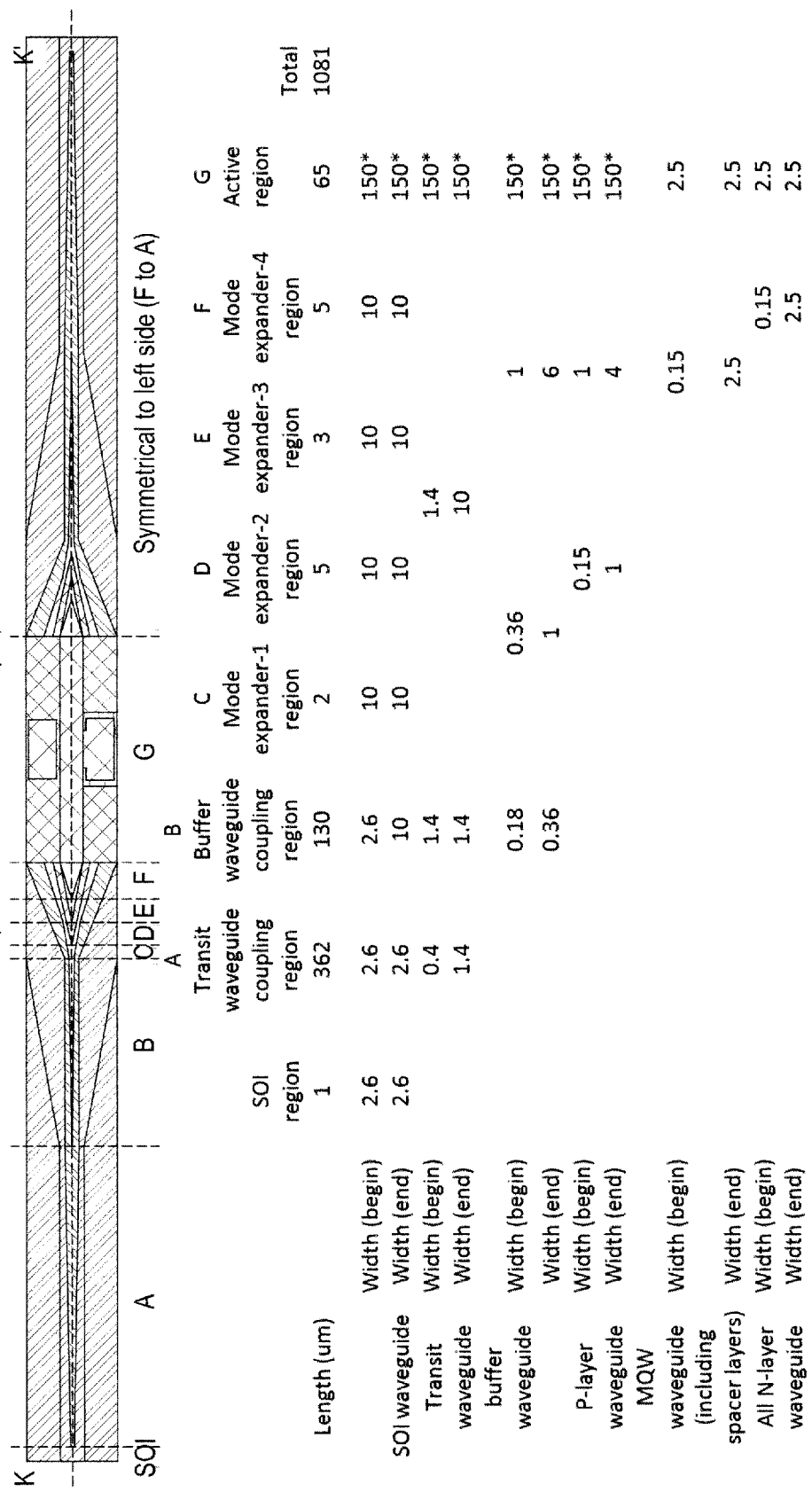
FIG. 11 shows the device design #3 top view with detailed device structure for each section based on the SiGe epitaxial layer structure shown in FIG. 10 with GS electrode structure.
Figure 12:
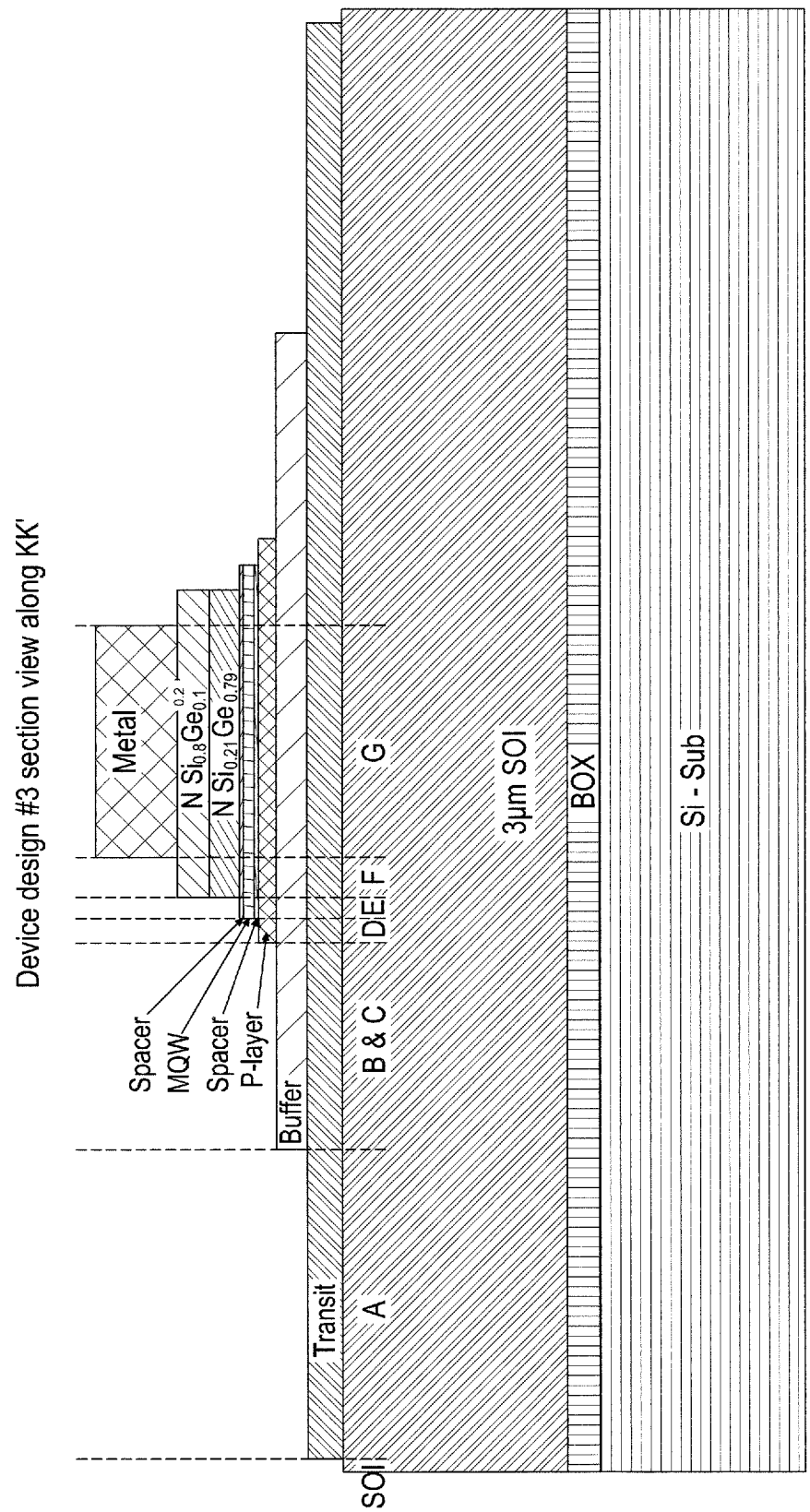
FIG. 12 is the section view along the middle line KK' of the device design #3.

An example (EPI design #2) and an associated device design #3 is shown in FIGS. 10-12. this embodiment differs from that of FIG. 1(EPI design #1) in that:
a) Transit buffer layer: 600 nm, $Si_{0.9}Ge_{0.1}$
b) cover N-doped layer: $Si_{0.9}Ge_{0.1}$ As with the devices described above, devices including the EPI design of the second embodiment may be fabricated with:
a) GS electrodes; or
b) GSG electrodes In a third example, device design #3, the taper structure comprises 6 segments to expand the optical mode of buffer waveguide to the optical mode of SiGe MQW waveguide: four mode expander regions (C, D, E, and F) as well as the transit waveguide coupling region A and the buffer waveguide coupling region B. The simulation results for device design #3 at 1.3 µm wavelength for TE mode are below: insertion loss 4.87 dB, extinction ratio 4.16 dB and link penalty 9.97 dB.

Figure 14:
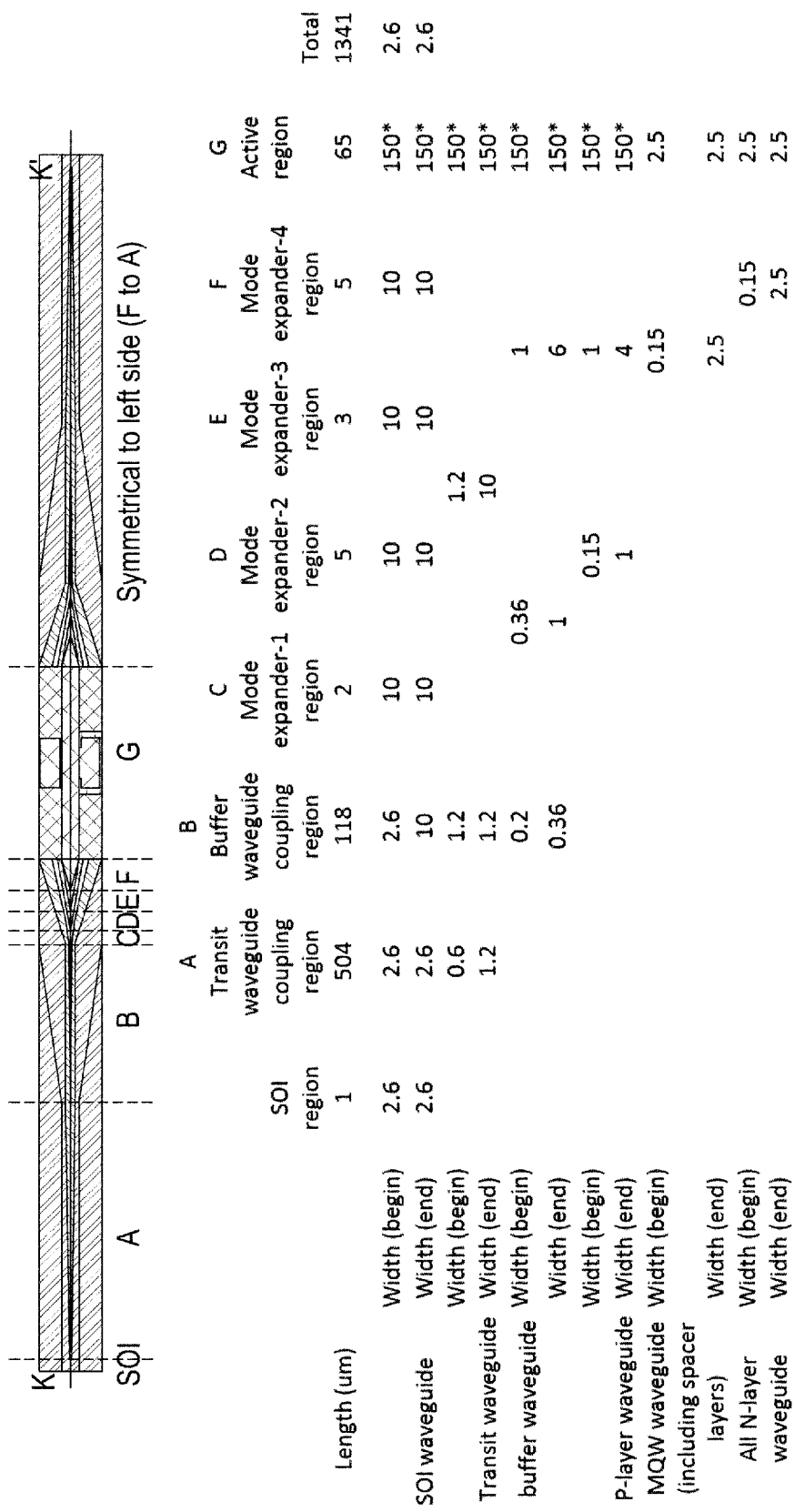
FIG. 14 shows the device design #4 top view with detailed device structure for each section based on the SiGe epitaxial layer structure shown in FIG. 13 with GS electrode structure.
Figure 15:
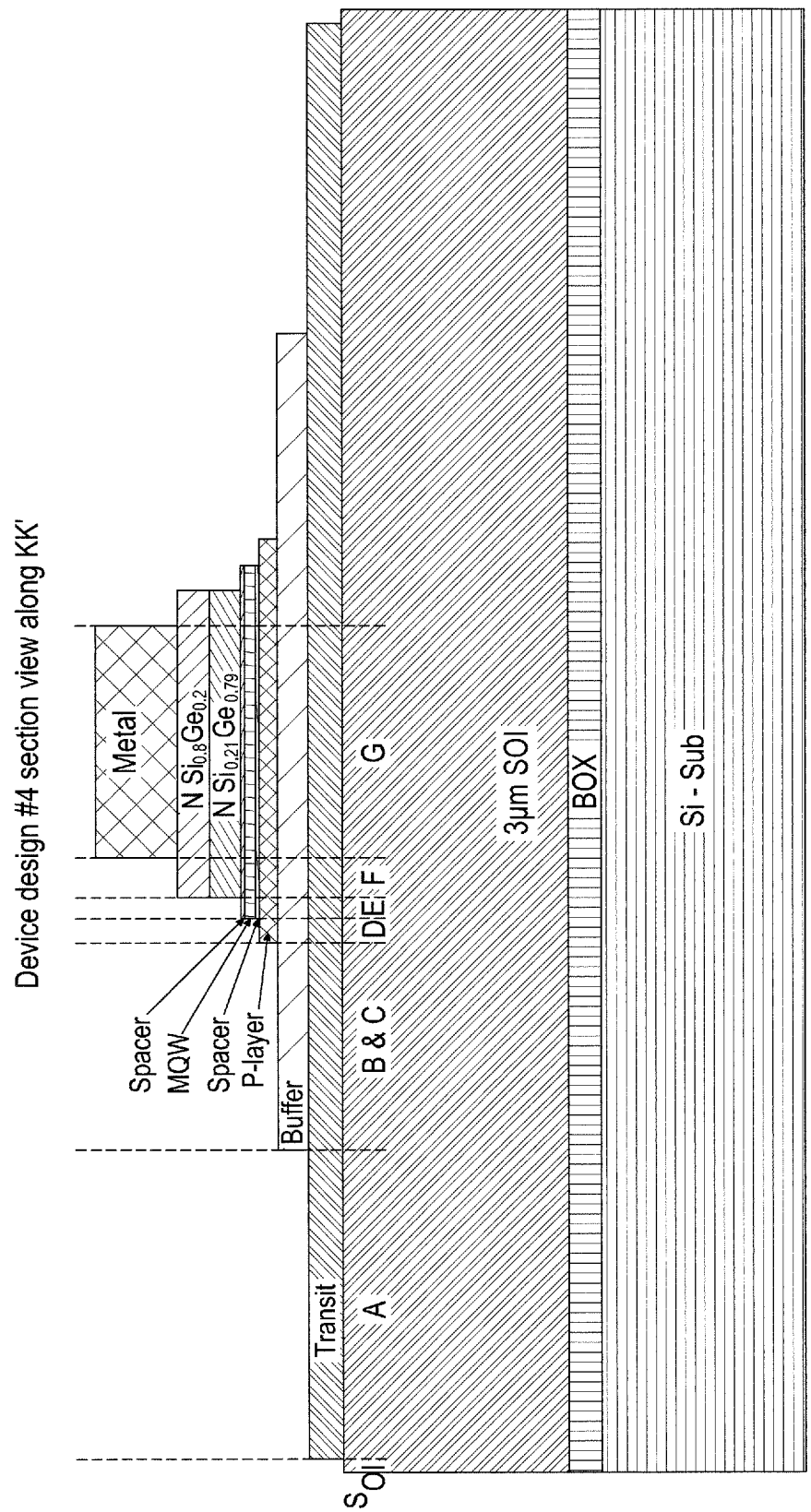
FIG. 15 is the section view along the middle line KK' of the device design #4.

A third embodiment (EPI design #3) of the present invention and an associated device design #4 is shown in FIGS. 13-15. This embodiment differs from that of FIG. 1 (EPI design #1) in that:
a) Transit buffer layer: 800 nm, $Si_{0.9}Ge_{0.1}$
b) cover N-doped layer: $Si_{0.9}Ge_{0.1}$ As with the devices described above, devices including the EPI design of the third embodiment may be fabricated with:
a) GS electrodes; or
b) GSG electrodes.

In this device design #4, the taper structure comprises 6 segments to expand the optical mode of buffer waveguide to the optical mode of SiGe MQW waveguide: four mode expander regions (C, D, E, and F) as well as the transit waveguide coupling region A and the buffer waveguide coupling region B. The simulation results for device design #4 at 1.3 µm wavelength for TE mode are below: insertion loss 4.66 dB, extinction ratio 4.16 dB and link penalty 9.76 dB.

Figure 16:
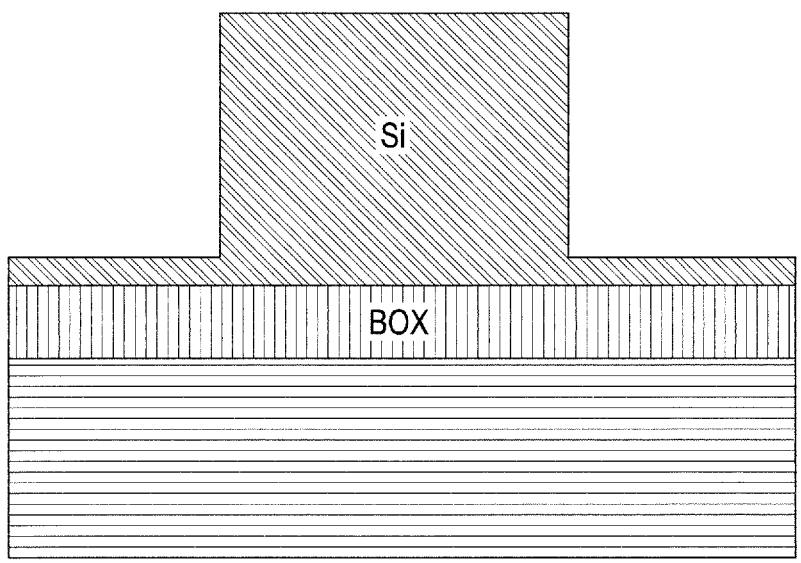
FIG. 16 is the input/output 3 μm SOI waveguide for use with all devices disclosed herein.

An example of in input (and/or output waveguide) for coupling to any one of the EPI regions described herein is shown in FIG. 16. In some embodiments, this may take the form of a 3 µm SOI waveguide.

Figure 17:
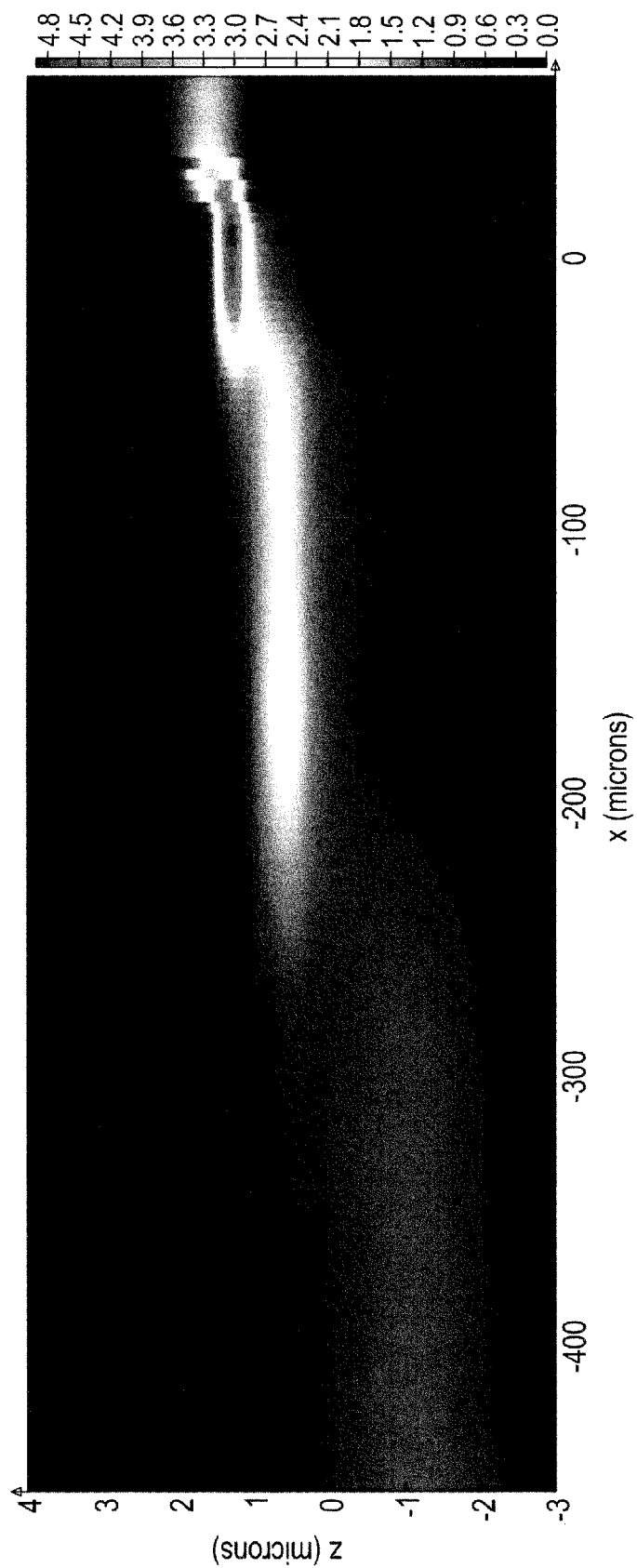
FIG. 17 is typical optical transition from 3 μm SOI waveguide to SiGe MQW waveguide simulation result at 1.3 μm wavelength.

Typical optical transition from 3 µm SOI waveguide to SiGe MQW waveguide simulation result at 1.3 µm wavelength is shown in FIG. 17 for a half device structure. The device is symmetric, so the half structure simulation enabled relevant information to be achieved whilst conserving computer space.

Figure 18:
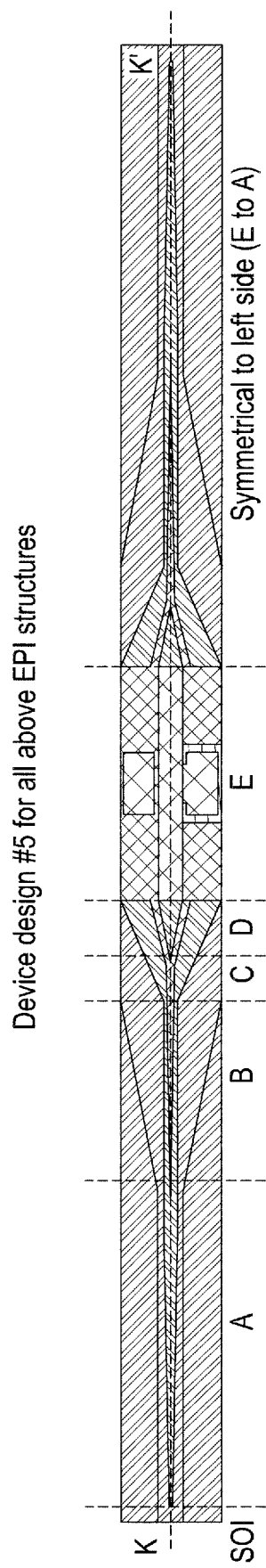
FIG. 18 is the top view of a device design #5 based on any one of the SiGe epitaxial layer structures shown in FIG. 1, FIG. 10 and FIG. 13, the device of FIG. 18 having a GS electrode structure.
Figure 19:
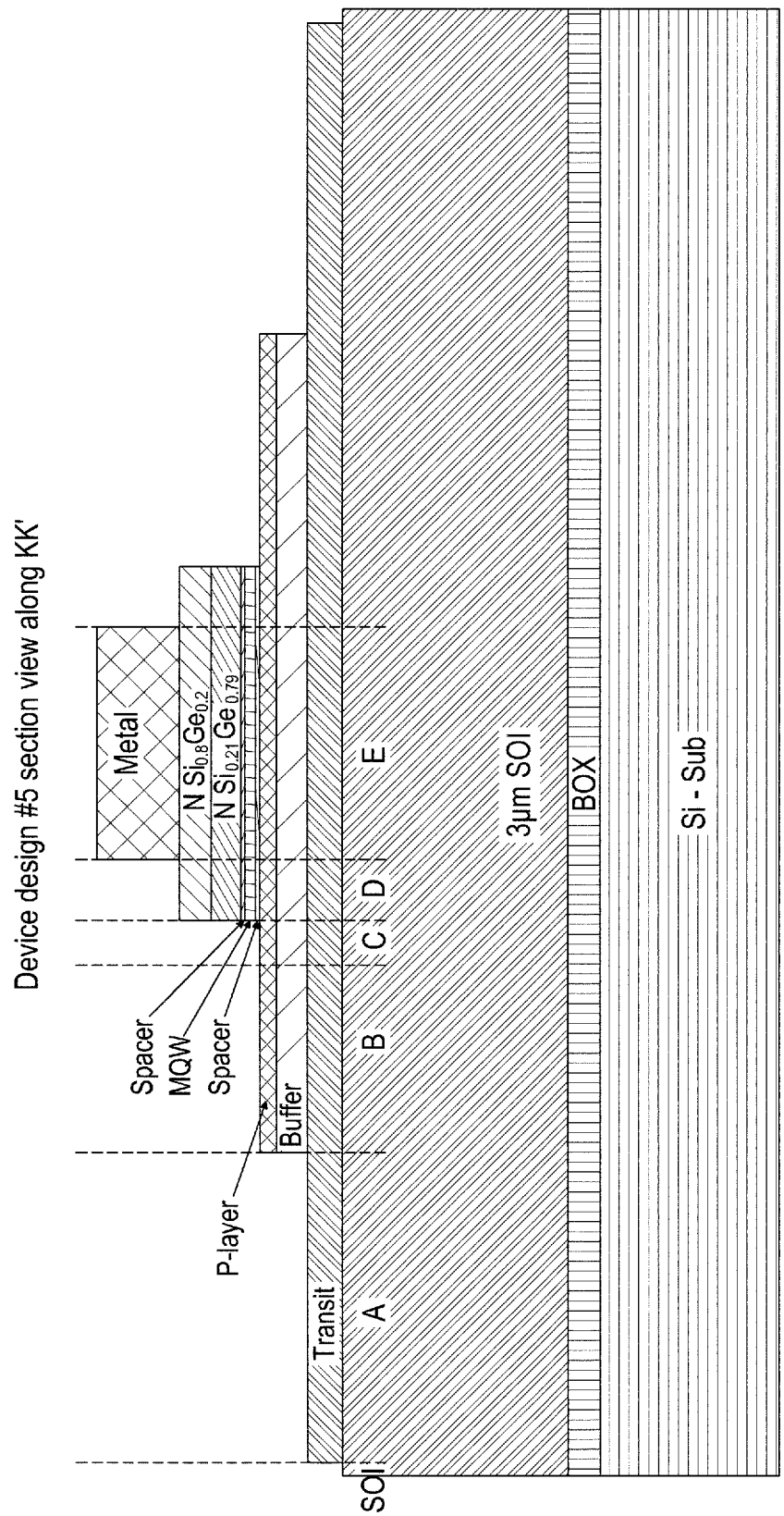
FIG. 19 is the section view along the middle line KK' of the device design #5

FIG. 18 shows another example of a device design; "device design #5". This device design is could contain any one of the EPI structures of the embodiments (EPI design #1, EPI design #2 and EPI design #3) shown in FIG. 1, FIG. 10 and FIG. 13. The taper structure of device design #5 comprises 4 segments which act to expand the optical mode of buffer waveguide to the optical mode of SiGe MQW waveguide: two mode expander regions (C and D) as well as the transit waveguide coupling region A and the buffer waveguide coupling region B. An advantage of using such a taper structure with 4 segments is the ease of device fabrication process with fewer processing steps. FIG. 19 shows the section view of design #5 along the middle line KK'.

Figure 20:
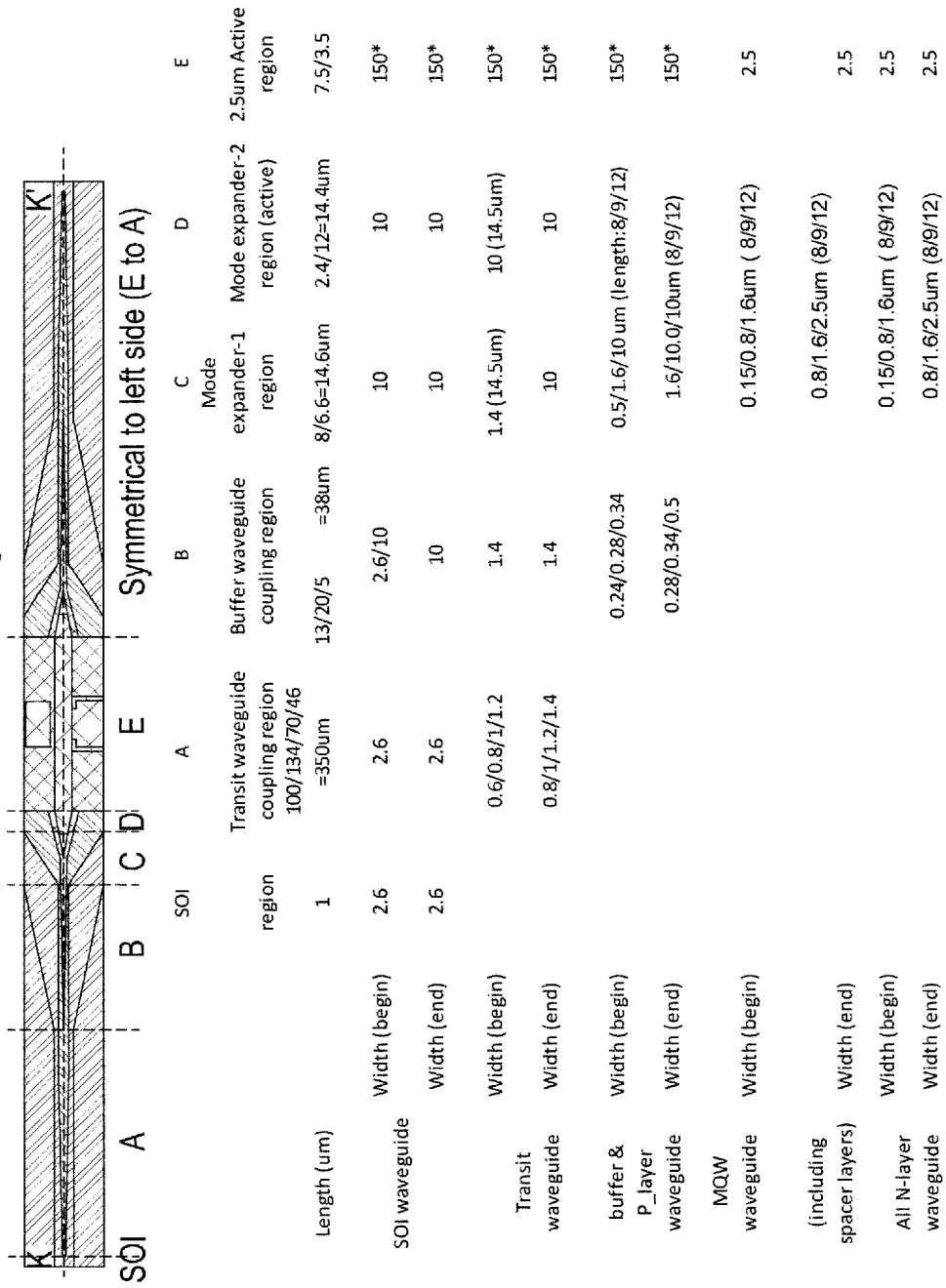
FIG. 20 shows a device design #1B in a top view with detailed device structure for each section.

A fourth embodiment (EPI design #1B) of the present invention and associated device design is shown in FIG. 20-21.

An example of measurements for the entire device is shown in FIG. 20, and a section view of the device is shown in FIG. 21. This design differs from that shown in, for example, FIG. 14, in at least that the electrodes of FIG. 20 which are in contact with a surface of the active region opposite the coupler extend beyond the main body of the active region in a direction towards their respective taper regions. In this embodiment, the MQW region comprises a main section in the main body of the active region, but also includes at least one tapered portion of MQW material which extends from the main body of the active material forming active tapered portions overlaying the tapered layers underneath. As can be seen in FIG. 20, the tapered portions of the MQW material therefore extend outwards from the main body of the active region (marked "E") into at least the active mode expander region (marked "D").

Although exemplary embodiments of an electroabsorption modulator have been specifically described and illustrated herein, many modifications and variations will be apparent to those skilled in the art. Accordingly, it is to be understood that an electroabsorption modulator constructed according to principles of this invention may be embodied other than as specifically described herein. The invention is also defined in the following claims, and equivalents thereof.

What is claimed is:

1. An electroabsorption modulator comprising:
an SOI waveguide;
an active region, the active region comprising a multiple quantum well (MQW) region; and
a coupler for coupling the SOI waveguide to the active region,
the coupler comprising:
a transit waveguide coupling region;
a buffer waveguide coupling region; and
a taper region,
wherein:
the transit waveguide coupling region is configured to couple light between the SOI waveguide and the buffer waveguide coupling region,
the buffer waveguide coupling region is configured to couple light between the transit waveguide coupling region and the taper region, and
the taper region is configured to couple light between the buffer waveguide coupling region and the active region.

2. The electroabsorption modulator of claim 1, wherein the taper region comprises a multi-segment mode expander.

3. The electroabsorption modulator of claim 1, wherein the multiple quantum well region is a Ge/SiGe multiple quantum well region.

4. The electroabsorption modulator of claim 1, wherein:
the transit waveguide coupling region comprises a first portion of a transit waveguide; and
the buffer waveguide coupling region comprises a buffer waveguide located on top of a second portion of the transit waveguide.

5. The electroabsorption modulator of claim 4, wherein:
the transit waveguide has a refractive index bigger than that of the SOI waveguide but smaller than that of the buffer waveguide.

6. The electroabsorption modulator of claim 4, wherein:
the SOI waveguide is a 3 um waveguide;
the transit waveguide has a thickness of no more than 400 nm; and
the buffer waveguide has a thickness of no more than 400 nm.

7. The electroabsorption modulator of claim 6, wherein the transit waveguide has a thickness of no more than 600 nm.

8. The electroabsorption modulator of claim 6, wherein the transit waveguide has a thickness of no more than 800 nm.

9. The electroabsorption modulator of claim 4, wherein each of the buffer waveguide and transit waveguide are SiGe waveguides.

10. The electroabsorption modulator of claim 4, wherein the active region comprises:
a P-doped region between a buffer layer and a lower surface of a spacer layer underneath the multiple quantum well region; and
an N-doped region located at an upper surface of a spacer layer on top of the multiple quantum well region.

11. The electroabsorption modulator of claim 10, further comprising multiple N-type doped layers with different germanium compositions and doping concentrations.

12. The electroabsorption modulator of claim 1, wherein a waveguide slab of a P-doped region in the active region is P-doped with ion implantation followed by an RTA process.

13. The electroabsorption modulator of claim 1, further comprising electrodes arranged in a ground-signal (GS) configuration, wherein a ground electrode is located at an opposite side of the active region from a signal electrode.

14. The electroabsorption modulator of claim 1, further comprising electrodes arranged in a ground-signal-ground (GSG) configuration, where a first ground electrode and a second ground electrode are located at the same side of the active region as a signal electrode.

15. The electroabsorption modulator of claim 1, wherein the multiple quantum well region includes at least 5 quantum wells.

16. The electroabsorption modulator of claim 1, wherein a spacing between respective pairs of the quantum wells is in the range of 10 nm to 20 nm.

17. The electroabsorption modulator of claim 1, wherein each quantum well in the multiple quantum well region has a thickness in the range of 5 nm to 15 nm.

18. The electroabsorption modulator of claim 1, further comprising a metal electrode in contact with a surface of the active region opposite to the coupler, wherein the MQW region includes at least one tapered portion of MQW material which extends into the taper region; and wherein the metal electrode extends as far as the tapered portion of MQW material.

19. The electroabsorption modulator of claim 18, wherein the electrode has a length in a direction towards the taper region which is greater than 2.5 µm.

20. The electroabsorption modulator of claim 1, wherein the active region includes an N-doped region located above an upper surface of a spacer layer on top of the multiple quantum well region, and wherein the N-doped region comprises $Si_{0.9}Ge_{0.1}$.

21. The electroabsorption modulator of claim 1, wherein:
the transit waveguide coupling region comprises a first portion of a transit buffer layer on the SOI waveguide; and
the buffer waveguide coupling region comprises a second portion of the transit buffer layer on the SOI waveguide and a first portion of a buffer layer on the second portion of the transit buffer layer, the second portion of the transit buffer layer being between the SOI waveguide and the first portion of the buffer layer.

22. The electroabsorption modulator of claim 21, wherein:
an index of refraction of the transit buffer layer is greater than an index of refraction of the SOI waveguide; and
an index of refraction of the buffer layer is greater than the index of refraction of the transit buffer layer.

23. The electroabsorption modulator of claim 1, wherein:
the taper region comprises a first mode expander region and a second mode expander region;
the first mode expander region is configured to couple light between the buffer waveguide coupling region and the second mode expander region;
a first end of the first mode expander region abuts against the buffer waveguide coupling region;
the first mode expander region comprises a first portion of a buffer layer having a first width at the first end of first mode expander region, the width of the first portion of the buffer layer expanding, according to a first taper angle, to a second width at a second end, opposite the first end, of the first mode expander region;
a first end of the second mode expander region abuts against the second end of the first mode expander region; and
the second mode expander region comprises a second portion of the buffer layer having the second width at the first end of the second mode expander region, the width of the second portion of the buffer layer expanding, according to a second taper angle, greater than the first taper angle, to a third width at a second end, opposite the first end, of the second mode expander region.

* * * * *